March 19, 1957 H. D. BOGGS 2,785,442
METHOD OF MAKING A REINFORCED HOLLOW CYLINDRICAL ARTICLE
Filed Jan. 4, 1952 2 Sheets-Sheet 1
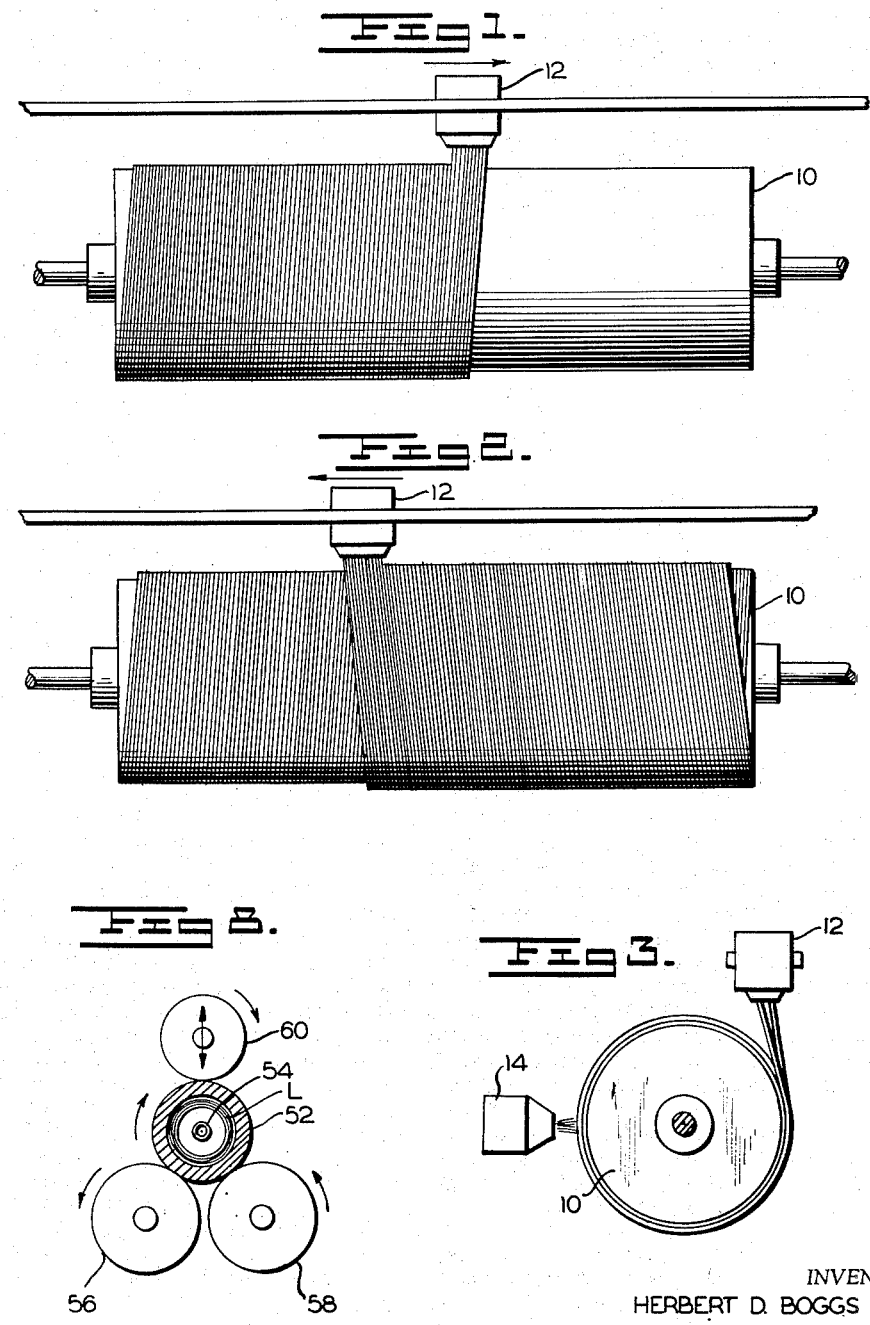
INVENTOR
HERBERT D. BOGGS
BY Cushman, Darby & Cushman
ATTORNEY March 19, 1957  H. D. BOGGS  2,785,442
METHOD OF MAKING A REINFORCED HOLLOW CYLINDRICAL ARTICLE
Filed Jan. 4, 1952  2 Sheets-Sheet 2
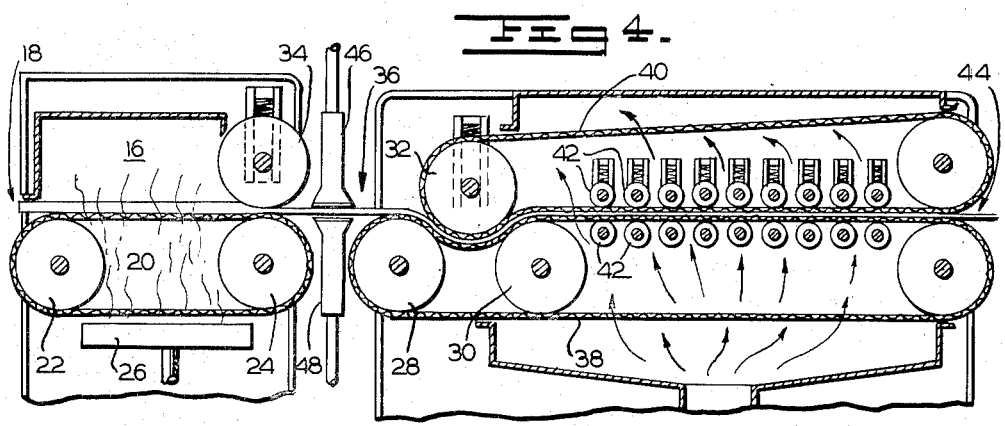
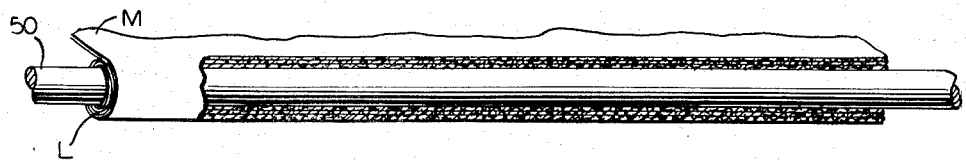
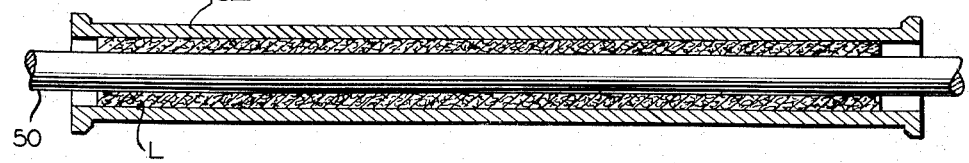
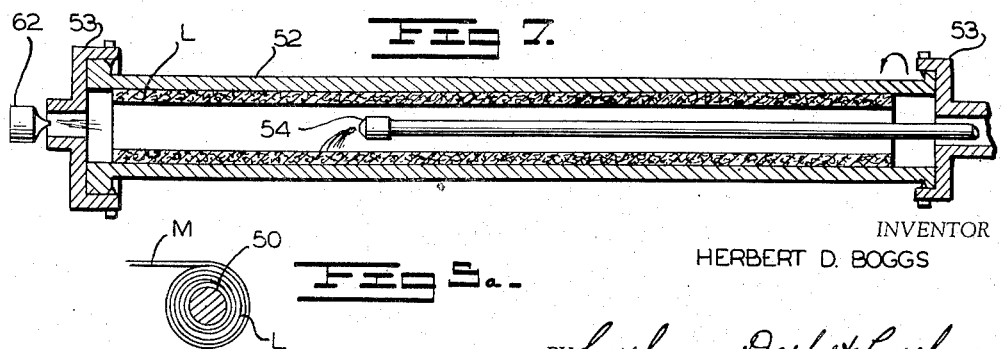
INVENTOR
HERBERT D. BOGGS
BY *Cushman, Darby & Cushman*
ATTORNEY

United States Patent Office 2,785,442
Patented Mar. 19, 1957

2,785,442

METHOD OF MAKING A REINFORCED HOLLOW CYLINDRICAL ARTICLE

Herbert D. Boggs, Tulsa, Okla., assignor, by mesne assignments, to H. D. Boggs Company, Ltd., Omaha, Nebr., a limited partnership of Nebraska Application January 4, 1952, Serial No. 264,976

4 Claims. (Cl. 18—58.3)

This invention relates to plastic tubular members and methods for the manufacture thereof. More particularly, it relates to plastic, fiber-reinforced pipe of high structural strength, which pipe may be of relatively large diameter. The invention further relates to new improvements in procedures for the centrifugal casting of such pipe.

Non-metallic pipe of light weight has many advantages over metal pipe, e. g., much greater length per unit weight, much greater corrosion resistance, at least as great structural strength, and greater ease of installation and fabrication. However, in spite of all the advantages of such pipe, it has found relatively little use and sale as compared to metal pipe in the past and, actually, in larger size pipe, such as two inch diameter or greater, it has appeared principally only on an experimental basis.

The lack of prior widespread sale and use of non-metallic pipe has been in part due to the high cost of such pipe. However, this is not the only or the greatest deficiency of prior non-metallic pipe. Primarily, such pipe has had such relatively poor structural strength that it has only found use where metallic pipe has been completely unsatisfactory, as due to corrosion. For example, glass pipe has found some use for carrying corrosive liquids, but its strength and safety limitations are well known. In realization of this and in an attempt to take advantage of the physical properties of so-called plastic materials, numerous attempts have been made in the past to make plastic pipe of a truly competitive type. This has been attempted, using both thermosetting and thermoplastic resinous or plastic materials. A sizable amount of pipe of thermoplastic materials has been made and sold in the past for special uses, especially such pipe made from a plasticized, unfilled base formed by an extrusion operation. However, the inherent strength limitations of such pipe has and apparently will keep it from becoming generally competitive with metallic pipe.

As indicated, the weaknesses of thermoplastic pipe is well known and, hence, attempts have been made heretofore to use thermosetting plastic materials to form pipe, hoping thereby to produce a pipe of greater structural strength, somewhere near comparable to metallic pipe. In this regard, it has been realized that such pipe would require reinforcing filler material to fortify the thermoset plastic, and so plastic pipe has been made by winding threads of spun glass or other fibers about a mandrel to form a tubular element and coating or in some other fashion applying thermosetting plastic thereto and then curing the resulting structure to form a section of pipe. Such procedures have successfully made pipe, but it has invariably been of limited structural strength and such pipe has not been, in any sense, competitive with metallic pipe for general use. This is so, among several reasons, because the bursting strength of such pipe has been low in lengths of a foot or more.

In addition to the fiber winding operations, other plastic pipe forming operations have been tried in the past. Thus, plastic pipe has been formed by extending a mix of plastic material and reinforcing fibers into a tubular form and then curing the resulting structure. However, here again the resulting pipe has been unsatisfactory for general usage in competition with metal pipe principally due to low burst and other structure strength.

OBJECTS

A principal object of the present invention is the provision of new forms of pipe or tubing made of plastic material. Still further objects include:

1. The provision of new improvements in the methods for the manufacture of pipe or tubing composed to a large extent of plastic material.

2. The provision of plastic pipe having relatively great structural strength, i. e., high compressional, tensile, bursting and torsional strength.

3. The provision of plastic pipe which is characterized by a high uniformity of composition and structure and does not exhibit any tendency to leak or burst along cleavage planes, lines, or areas of weakness as in the case of so-called plastic pipes which have been marketed heretofore.

4. The provision of plastic pipe comprising about 50 to 80% plastic material and about 20 to 50% reinforcing fibrous or filamentary material having great corrosion resistance, great strength and light weight.

5. The provision of new procedures for the formation of components used in the formation of plastic pipe.

6. The provision of new methods for the formation of reinforcing webs of filamentary materials to be used in the production of plastic pipe.

7. The provision of a new operation for ensuring that the reinforcing fibers of a plastic pipe are thoroughly "wet" by plastic material during the formation of plastic pipe and, thus, that there is intimate contact between the plastic bonding material in plastic pipe made from plastic material reinforced with internally located fibers.

8. The provision of plastic pipe forming methods which are especially suited for the making of plastic pipe from thermosetting resins and glass-fiber reinforcing elements, though they are also applicable to making of pipe from other and varied resinous or plastic materials and fibrous reinforcing materials.

9. The provision of a novel method of controlling the heat of polymerization in the formation of plastic pipe and of insuring the production of highly uniform pipe free of voids or other structural deformities.

10. The provision of new forms of plastic pipe made of thermoset resin and reinforcing glass-fibers.

11. The provision of new methods for the production of a matrix of glass fibers in special orientated form intimately united to a minor amount of plastic material which may be used to form plastic pipe through fabrication with additional plastic material without experiencing any difficulty of properly bonding the plastic material to the glass fibers whereby a final structure of highly uniform nature and desirable characteristics is obtained.

12. The provision of new improvements in the formation of plastic pipe by centrifugal casting.

13. The provision of new improvements in charging casting molds with pipe forming materials in the manufacture of plastic pipe.

14. The provision of new plastic pipe forming methods which substantially eliminate the existence of cracks or similar areas of weakness in the resulting pipe.

15. The provision of a new method for the formation of glass-fiber felts for use in the manufacture of plastic pipe.

16. The provision of new plastic pipe forming methods which permit the resulting pipe to be removed from the forming mold without difficulty and without injury to the pipe.

17. The provision of plastic pipe of unusual high and uniform burst strength, i. e., plastic pipe which has excellent burst strength comparable to that of cast metal pipe along entire lengths thereof and not just in short sections thereof, prior pipe having been characterized by adjacent sections being relatively weak due to the presence of uneven portions or areas in which most of the reinforcing fibers of the plastic pipe lie in a plane or form the locus of a line thereby creating a line or plane of weakness naturally lowering the burst strength of the pipe at that point.

18. The provision of fiber reinforced pipe which has both smooth outer and inner surfaces and which does not show the general appearance of having any fibrous inner structure when viewed by reflected light.

19. The provision of new improvements in methods of making plastic pipe which make it possible to manufacture it at such a low relative cost that it can compete in the open market with metal pipe such as cast iron pipe or the like.

Further objects and the entire scope of the invention will become apparent from the following detailed description and from the appended claims.

GENERAL DESCRIPTION

The above objects are accomplished according to the present invention by a new combination of operations comprising the uniting of thermosetting plastic material with reinforcing fibers and shaping the united elements into a pipe or tubular shape. This is accomplished by forming a special mat or felt of reinforcing fibers, spiral winding the felt into a liner of tubular shape, inserting the tubularly-shaped liner into a casting mold, spinning the mold in a suitable device, spraying or producing an equivalent distribution of thermosetting plastic material onto the inner surface of the felt within the spinning mold, heating the mold or otherwise subjecting the contents of the mold to polymerizing conditions, causing the plastic material with encased fiber felt to cure to a solid body and then removing the resulting tubular member from the mold following discontinuation of the polymerization step.

In a preferred embodiment of the invention, the felt of reinforcing fibers is made by arranging fibers, particularly glass fibers, in the form of continuous web with a substantial number of the fibers running at some acute angle to the longitudinal axis of the web, another substantial number of the fibers running at an acute angle to these prior mentioned fibers and to the longitudinal axis of the web and then with the remainder of the fibers randomly displaced throughout the felt. Such a felt will have generally criss-cross patterns of fibers in the plane of the felt while there should be an absolute random distribution of fibers within the felt along a line normal to the plane of the felt.

Such a felt is preferably formed with a thermoplastic coating on the fibers and although the amount of such plastic can be varied, it is preferably of such amount to give the felt a substantial board-like appearance and nature when studied at room temperature.

The plastic coated fiber felt is next expanded, while the plastic coating is heated to an elevated temperature, such as by drawing the felt in its longitudinal direction, to form a relatively open-meshed, net-like structure of lesser thickness and density than the non-expanded felt, but of substantially greater length of width than the original. The resulting, net-like web is next spirally wound into a tube which is inserted into a tubular mold. The mold is then positioned in some suitable apparatus such as that shown and described in applicant's copending application, Serial No. 200,193, filed December 11, 1950, and rotated at relatively high speed. With the mold and its content revolving rapidly, plastic material is injected into the mold such as by spraying upon the inner surface of the felt held within. The mold is heated and the plastic is caused to polymerize or cure as it penetrates into the felt and encases the fibers thereof.

Preferably, the polymerization is brought about by heating the mold and contents. As the polymerization progresses, exothermic reaction heat enters the process and is generally created very rapidly at a critical point of the operations. It has been discovered that the tendency of exothermic heat to form voids and weak spots in the pipe can be eliminated by adding the thermosetting plastic material to the mold in separate portions, the second, and succeeding portions, if desired, being introduced at or just prior to the peak in evolution of the exothermic heat.

Following the addition of the bonding plastic material and the effluxion of time required to cure the resulting matrix to a solid body, the mold and contained pipe is preferably subjected to an "after heat" to enable the pipe to be removed from the mold.

DETAILED DESCRIPTION

The invention may be best understood with reference to the accompanying drawings, in which:

Figure 1 shows a spinning drum with fibers being wound thereon.

Figure 2 shows a further development of fibers winding on the drum of Figure 1.

Figure 3 shows an end view of the fiber spinning operation.

Figure 4 shows a mat extending operation.

Figures 5 and 5a show details of winding a mat on a mandrel.

Figure 6 shows a mandrel and liner in place in a mold.

Figure 7 shows the spraying of plastic materials onto a mat in a spinnable mold, and Figure 8 shows an end view of the spinning apparatus of Figure 7.

Referring to Figures 1–3, the mat of reinforcing fibers may be fabricated by winding glass filament on a drum 10. Glass filaments may be continuously fed from a melting oven 12 while relative longitudinal movement is imparted between the oven 12 and drum 10. Usually it will be most convenient to move the oven 12 while maintaining the drum 10 stationary as far as longitudinal movement is concerned. Any convenient means for winding the filaments on the drum and simultaneously imparting relative motion may be employed. For example, suitable apparatus for carrying out this function may be found in the United States patents to Modigliani, 2,081,060; Stephens, 2,467,999, and Holcomb, 2,505,045.

The particular characteristic of my mat is that the "lead" or "pitch" of the glass filaments is such that as the oven 12 is moved back and forth along the length of the drum 10 the filaments in a given layer will overlie the filaments of the previous layer at an acute angle more or less as illustrated in Figure 2.

Preferably, while the filaments are being wound on the drum 10 a suitable binder is applied to the fibers as they are drawn from the oven 12. The binder is preferably a polyester emulsified in water and sprayed or brushed onto the fibers while spinning. This spray may be accomplished as diagrammatically illustrated by a spray nozzle 14 in Figure 3. A suitable type of polyester is that known in the trade as "Laminac 4116" produced by the American Cyanamid Company, this being a so-called rigid type. However, other types of polyesters are usable in emulsion form. Good results have been obtained with emulsions of thermosetting polyesters which act as thermoplastics below 150° F., but which thermoset at heats above 200° F. and no longer will act as thermoplastics.

The process of developing the mat may continue with the drum 10 rotating until a desired thickness of mat is achieved. The binder will tend to harden to make the mat more or less stiff. It will be understood that the drum 10 is of considerable diameter and, therefore, a mat of considerable dimension may be obtained by simply slicing the mat along the drum surface parallel to the axis thereof and removing the mat.

Mats as prepared above are next expanded as follows: Referring to Figure 4, the mats are first introduced into a heating chamber 16 by inserting the mats as at 18 on an open-mesh traveling belt 20 running over rollers 22 and 24. Heat is applied in chamber 16 by means of any suitable heating unit 26 and the arrangement is such that the mat preferably is heated to between 125°–150° F. When warm, the binder becomes thermoplastic and therefore pliable and soft, so that expansion and re-arrangement of the fibers can be accomplished. The binder also acts as a sizing material or lubricant so that the fibers will not abrade themselves while being expanded.

The mat is expanded by applying traction to the mat between the three rollers 28, 30, and 32, these rollers having a peripheral velocity slightly greater than roller 24 and an adjacent roller 34. Accordingly, expansion of the mat occurs at 36. The mats are then further carried by open-mesh belts 38 and 40 which compress the mat into condensed sheets while the binder is thermoplastic but is air-cooling. The compression may be caused by a plurality of relatively small diameter rollers 42 pressing against belts 38 and 40 as illustrated in Figure 4. With the mat prepared as described above high velocity cooled air may then be circulated through the compressing chamber while the compressing action is taking place, so that by the time the mat leaves the compressing chamber it is cooled and bonded together with the uncured but compatible polyester resin. Sheets of finished mat are then available at 44.

A variation of the above preparation of mats is the application of a powdered catalyzed thermosetting polyester resin to the mat by means of an air blast 46 and suction 48 at the expanding position 36. Then the mat in the compression chamber may be subject to heat as by circulating air heated to 300° to 500° F. so that the deposited resin dust is cured and binds the mat together into a sheet.

The next step in the process according to the present invention is to wind the mats as above prepared on mandrels to form mold tubes or liners. Referring now to Figures 5 and 5a, a mat designated M is wound about a mandrel 50 any predetermined number of times until a mold liner L is built up to desired thickness. Normally, it will be preferable to cut the mat so that the starting and finishing ends are overlapped by at least 30° and preferably overlapped up to 180°.

With the liner wrapped around the mandrel 50 the combined liner and mandrel may be inserted into a pipe casting mold 52. The mold with mandrel and liner in place are shown in Figure 6. Next, the mandrel may be removed with the liner remaining within the mold and lying against the inner surface thereof, which places the liner and mold in readiness for centrifugal casting.

With the liner in place within the mold, the mold may next be placed in a suitable centrifugal casting machine for application of the thermosetting of thermoplastic material to form the pipe. The casting operation may take place in apparatus such as that described in my above mentioned copending patent application Serial No. 200,193, filed December 11, 1950 for Pipe Forming Machine and Method. The disclosure of that application is intended to be considered as incorporated in this disclosure for purposes of detailed description, and the present application constitutes a continuation-in-part of that application in this and other respects.

It is deemed sufficient in the present specification to only diagrammatically illustrate the casting operation as in Figure 7. In this figure the mold 52 is shown within the liner L in place and with a dispensing head 54 of the type shown in the above-mentioned patent application positioned within the liner. Caps 53 may be placed on the ends of the mold to prevent liquids from running out of the ends of the mold. As is fully described in my copending patent application, the mold 52 has heat applied thereto and is at the same time rapidly rotated. While the rotation of the mold and liner progresses the head 54 is moved longitudinally through the liner and mold to place an evenly distributed coating of the plastic material against the liner. Because of the centrifugal forces involved, the plastic material will impregnate the liner. The head 54 may be arranged to spray the plastic onto the liner, or, preferably, simply a stream of the liquid plastic may issue from the head. Streaming, rather than spraying the plastic, is preferable since streaming, in most instances, will more effectively work entrapped air out of the plastic.

Spinning of mold 52 is carried out by sets of three rollers 56, 58 and 60 positioned as shown in Figure 8 and as fully described in my above-mentioned copending application.

OPERATING CONDITIONS

I have discovered that improved centrifugally cast pipe as outlined in the foregoing is produced because of the following conditions and techniques: First, the pipe is produced with a smooth unbroken interior. This means that no reinforcing fibers are exposed and that there are not any cracks or "crazes" in the inside surface of the pipe. The inside surface is a pure polyester resin or like material which may act as a pressure barrier for carrying high pressure liquids and the like. I have found that high pressure performance especially under pump surges requires such an unbroken surface.

Apparently in prior practices internal cracking or crazing has come about because the inside surface of the pipe would tend to shrink more than the section just beneath where the glass fiber reinforcement results in less shrink. Therefore, there is a tendency to craze or crack only down to the fiber surface. To control this crazing I have found that, among other things, the following should be observed:

The surface thickness of the resin between the inner surface of the pipe and the inner surface of the liner should be preferably 0.10 inch or less.

The resin may be impregnated in a single pass of the applicator head when the resin which is used jells hard prior to exotherm reaction and the exotherm heat is not too high. However, where such conditions are not met, then I find it preferable to apply the full resin load in successive passes of the applicator through the liner so that each layer of resin bonds with the previous layer but takes the exotherm heat from the preceding layer to set off the cure. This results in a lower exotherm overall heat than will result when the complete mass is impregnated and heated at the same time. Lower exotherm heats in the range of 10 to 40° F. appear to set up less stress and shrink in the inner pipe surface.

In addition to the above, after the final application of resin on the last pass is delivered in the spinning roll, I have found that air jetted through the mold takes away the high heats of exotherm and further improves the condition of the pipe. This may be readily accomplished by centering a jet such as 62 (Figure 7) in either end of the mold and blowing air at 50 to 100 p. s. i. through the jets alternately from each end at one minute intervals.

I have further found that a close control of heat applied to the mold ranging between plus or minus 5° F. variation from a given heat setting lessens the shrink in the pipe and further prevents crazing. It is furthermore possible to hold down exotherm heats by employing combinations of high temperature and low temperature catalysts or low catalyst concentrations ranging from .3% to 1%.

SAMPLE CASTING PROCEDURES a. Preferred method

Starting with reinforcing liners in place within casting molds and with the molds in place in casting apparatus, by a preferred method of the present invention I have found that the mold should first be rotated at high speeds, which may be of the order of 2800 R. P. M. for molds of four inches in diameter. Corresponding peripheral speeds may be employed with molds of other diameters. With the mold running at such speed the applicator or spray head should be moved longitudinally through the mold to apply plastic and the high speed maintained for at least two minutes before dropping back to a running speed of about 2200 R. P. M. The heat may be applied to the mold after impregnation and held at about 200° F. (or other heat, depending on the resin employed). After the exotherm heat cycle is complete as read on a suitable temperature gauge, about two minutes of "after" heat at about 230° F. should be applied to the mold to effect good mold release.

b. Second method

In the second method the molds may be brought up to running speed and heat at about 180° F. applied for approximately three minutes. Then the full resin load may be impregnated at high speed over a period of substantially two minutes. Jetted air at one minute intervals from either end of the mold may then be applied and the external heat advanced to about 200° F. until the exotherm heat has been completely evolved. About two minutes of after heat at substantially 230° F. may then be applied to effect good mold release.

c. Third method

In the third method, the mold is again brought up to running speed at 180° F. for approximately three minutes and then two-thirds of the resin load is impregnated at high speed over a two minute interval. Seven minutes later the spray heads should be passed to impregnate the last one-third of the resin load. Jetted air may then be applied along with heat at 200° F. until exotherm is completed and after heat for two minutes at 230° F. may then be applied to effect good mold release.

d. Fourth method

This may be the same as the third method except that when the mold is to be turned at high speed and the impregnation of two-thirds of the resin load at 200° F. proceeds from the start. Seven minutes later, the last one-third of the resin load may be impregnated and air blown as in the above third method.

e. Fifth method

The molds should be brought up to running speed at 180° F. for three minutes and then one-third of the resin load impregnated at high speed. Upon completion of impregnation the speed should be returned to running speed with the heat advanced to 200° F. Then with the mold continuing to run at running speed, the second one-third of the resin may be impregnated three minutes after the first pass. Three minutes after the second pass the last one-third of the resin load may be applied and the jetted air applied until exotherm is completed with two minutes application of after heat at 230° F.

f. Sixth method

The full load of resin may be applied into the mold and liner before the mold is placed in the casting machine. The ends of the mold may then be sealed and the mold spun at high speed to distribute the resin. The speed may then be dropped back to running speed and 200° F. applied to the mold until exotherm heat is completely evolved. After heat may then be applied to effect good mold release.

g. Seventh method

Same as sixth method, except that the ends of the mold are unsealed and jetted air is blown through the mold until exotherm heat is completely evolved.

OTHER OPERATING SPECIFICATIONS

The general criterion for mats for use with the present invention is that the reinforcing fibers be generally continuous, the strands of fibers being made up of 10 to 200 filaments, and the diameter of the fibers ranging from 0.01 to 0.00001 inch in diameter. Preferred types of fibers are glass and inorganic, vinyl, nylon, rayon, organic cotton, linen, silk and other natural fibers. The fibers should be oriented in the mat at angles of 60° to the longitudinal axis of the mat, but may vary from 20 to 80°.

In the mats the ratio of fibers to resin should be 45% to 55% by weight of resin based on total weight. The resin may be addition polymerization type polyacrylic resins, phenolic resins, etc.

The methods of spraying the resin may vary as indicated in the foregoing according to the reactivity of the resin exotherm heat values. For two passes, two-thirds of the resin may be impregnated on the first pass and one-third on the second pass, or three-fourths may be deposited on the first pass and one-fourth on the second pass or four-fifths on the first pass and one-fifth on the second pass.

The mat should be wound starting from the inside end in a direction in which the mold will be rotated. That is, when the mat is wound on the mandrel the mandrel should be revolving in a direction opposite to the direction in which the molder will eventually be rotated.

The speed of impregnation should be as fast as practical.

Mold lubricants are not required, but mold release may be better due to lubrication if parawax and mineral oil are employed.

The liners may be made up of from 2 to 40 convolutions of mat, depending on mat thickness, on the one hand, and desired wall thickness on the other hand. The ends of the mat forming the liner should be overlapped, with no less than 2 inches overlap and up to 180° being preferred.

Some polyesters are inhibited by air, and where these are employed I have found that a mineral oil, if flowed into the mold following the impregnation of resin, will form a thin seal over the inner surface of the pipe. This seal eliminates tacky inside surfaces which otherwise may develop due to air inhibiting.

In the appended claims, the term "fibers" is intended to refer to individual filaments or to discrete bundles of filaments making up what may be termed strands.

CONCLUSION

The foregoing detailed description has been given for purposes of illustration and is not intended to limit the scope of the invention. On the contrary, the scope of the invention is to be determined from the appended claims.

I claim:

1. A method of making a reinforced hollow cylindrical article from thermosetting resins which comprises providing in a cylindrical mold a formation of fiber reinforcement material, applying thermosetting resin in liquid form on the inner surface of said formation in said mold, spinning the mold and contents about the longitudinal axis of the mold while horizontally disposed to permit said resin to penetrate said formation and surround the fibers thereof with sufficient resin supplied to provide a thickness of resin free of reinforcement fibers at the inner surface of the mold contents, applying heat to the exterior of the mold for curing the resin while the mold spins, and passing a gaseous medium through the interior of the mold and contents during the curing of the resin in amount sufficient to absorb heat from the mold contents to maintain the interior surface of the mold contents at a temperature no greater than the temperature of the mold.

2. A method as in claim 1 wherein the gaseous medium is alternately passed through the mold and contents first in one direction and then in the other direction to aid in maintaining the interior temperature as aforesaid uniform along the length of the contents of the mold.

3. A method of making a reinforced hollow cylindrical article from thermosetting resins which comprises providing in a cylindrical mold a formation of fiber reinforcement material, applying a first quantity of thermosetting resin in liquid form on the inner surface of said formation in said mold, spinning the mold and contents about the longitudinal axis of the mold while horizontally disposed to permit said resin to penetrate said formation and surround at least a portion of the fibers thereof, applying heat to the mold for the curing of said first quantity of resin while the mold spins, and subsequently applying a further quantity of thermosetting resin in liquid form into the mold contents at such time during the curing of said first quantity of resin that exothermic heat generated in said first quantity of resin due to curing thereof is absorbed by the further quantity of resin and aids in the curing thereof and also prevents excessive temperatures in the mold contents.

4. A method of making a reinforced hollow cylindrical article from thermosetting resins which comprises providing in a cylindrical mold a formation of fiber reinforcement material, applying thermosetting resin in liquid form on the inner surface of said formation in said mold, spinning the mold and contents about the longitudinal axis of the mold while horizontally disposed to permit said resin to penetrate said formation and cylindrical fibers thereof, curing the resin while the mold spins, and flowing a quantity of inert oil into the mold after the resin has been distributed to form a seal to prevent air inhibiting and to increase the casting pressures.

References Cited in the file of this patent

UNITED STATES PATENTS

| | | |
|---|---|---|
| 1,161,756 | Wolever | Nov. 23, 1915 |
| 1,318,520 | Wolever | Oct. 4, 1919 |
| 1,840,027 | Fetter | Jan. 5, 1932 |
| 2,081,060 | Modigliani | May 18, 1937 |
| 2,131,024 | Cordts | Sept. 27, 1938 |
| 2,265,226 | Clewell et al. | Dec. 9, 1941 |
| 2,285,370 | Staelin | June 2, 1942 |
| 2,349,549 | Hardman et al. | May 23, 1944 |
| 2,405,329 | Ruebensaal | Aug. 6, 1946 |
| 2,467,999 | Stephens | Apr. 19, 1949 |
| 2,516,030 | Swiss | July 30, 1950 |
| 2,552,599 | Stout | May 15, 1951 |
| 2,572,924 | Gonda | Oct. 30, 1951 |
| 2,594,838 | Alexander et al. | Apr. 29, 1952 |
| 2,614,058 | Francis | Oct. 14, 1952 |